(12) United States Patent
Lauter et al.

(10) Patent No.: US 7,623,655 B2
(45) Date of Patent: Nov. 24, 2009

(54) COMPUTING MODULAR POLYNOMIALS MODULO LARGE PRIMES

(75) Inventors: Kristin E. Lauter, La Jolla, CA (US); Denis X Charles, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 827 days.

(21) Appl. No.: 11/079,642

(22) Filed: Mar. 14, 2005

(65) Prior Publication Data

US 2006/0206554 A1 Sep. 14, 2006

(51) Int. Cl.
*H04L 9/14* (2006.01)
*H04L 9/30* (2006.01)

(52) U.S. Cl. .......................................... 380/28; 380/30
(58) Field of Classification Search ............... 380/28–30
See application file for complete search history.

(56) References Cited

OTHER PUBLICATIONS

Kohel, David. Endomorphism rings of elliptic curves over finite fields,1-104. Thesis UC Berkeley,1996. Berkeley:UCB, 1996.*
Agashe, A., et al., "Constructing Elliptic Curves with a know number of points over a prime field", in Lectures in honour of the 60th birthday of Hugh Cowie Williams, Fields Institute Cummunications Series, 1-17, 2003.
Blake, I., et al., "Elliptic Curves in Cryptography", Lond. Math. Soc., Lecture Note Series, Cambridge University Press, 1999.
Bosma, W., et al., "Handbook of Magma Functions", Sydney, 2003.
Burgess, D., et al., "On character sums and primitive roots", Proc. London Math Soc., III, 179-192, 1962.
Elkies, Noam, et al., "Elliptic and modular curves over finite fields and related computational issues", in Computational Perspectives on Number Theory: Proceedings of a Conference in Honor of A.O.L. Atkin (D.A. Buell and J.T. Teitelbaum, eds.), AMS/International Press, 21-76, 1998.
Lenstra, A. et al., "Algorithms in Number Theory", Handbook of Theoretical Computer Science, vol. A. Elsevier 6730715, 1990.
Mestre, J-F.; "La methode des graphes. Exemples et applications", Proceedings of the international conference on class numbers and fundamental units of algebraic number fields, Nagoya Univ., Nagoya, 217-242, 1986.
Schoof, Rene, "Nonsingular Plane Cubic Curves over Finite Fields", J. Combinatorial Theory, 2, 183-208, 1987.
Shoup, Victor, "Fast construction of irreducible polynomials over finite fields", J. Symbolic Computation, 471-391, 1994.
Silverman, Joseph H., "The Arithmetic of Elliptic Curves", Graduate Texts in Mathematics, Springer-Verlag, 1986.

* cited by examiner

*Primary Examiner*—Jung Kim
*Assistant Examiner*—Venkat Perungavoor
(74) *Attorney, Agent, or Firm*—Lee & Hayes, PLLC

(57) ABSTRACT

Systems and methods for computing modular polynomials modulo large primes are described. In one aspect, the systems and methods generate 1-isogenous elliptic curves. A modular polynomial modulo a large prime p is then computed as a function of 1-isogenous elliptic curves modulo p.

4 Claims, 4 Drawing Sheets

COMPUTING MODULAR POLYNOMIALS MODULO LARGE PRIMES

TECHNICAL FIELD

This disclosure relates to cryptology.

BACKGROUND

Modular polynomials are defining equations for modular curves, and are useful in many different aspects of computational number theory and cryptography. For example, computations with modular polynomials have been used to speed elliptic curve point-counting algorithms. The $l^{th}$ modular polynomial, $\phi_l(x,y)$, parameterizes pairs of elliptic curves with a cyclic isogeny of degree l between them. A conventional method for computing modular polynomials consists of computing the Fourier expansion of the modular j-function and solving a linear system of equations to obtain the integral coefficients of $\phi_l(x,y)$. Thus, the $l^{th}$ modular polynomial is a polynomial of two variables such that a zero is a pair of j-invariants of two elliptic curves which are isogenous with isogeny of degree l. These polynomials are extremely difficult to compute because the coefficients are so large (of size exponential in l). The largest l for which the modular polynomial has been computed in current tables is l=59.

SUMMARY

Systems and methods for computing modular polynomials modulo large primes are described. In one aspect, the systems and methods generate l-isogenous elliptic curves. A modular polynomial modulo a large prime p is then computed as a function of l-isogenous elliptic curves modulo p.

BRIEF DESCRIPTION OF THE DRAWINGS

In the Figures, the left-most digit of a component reference number identifies the particular Figure in which the component first appears.

DETAILED DESCRIPTION

Overview

Figure 1:
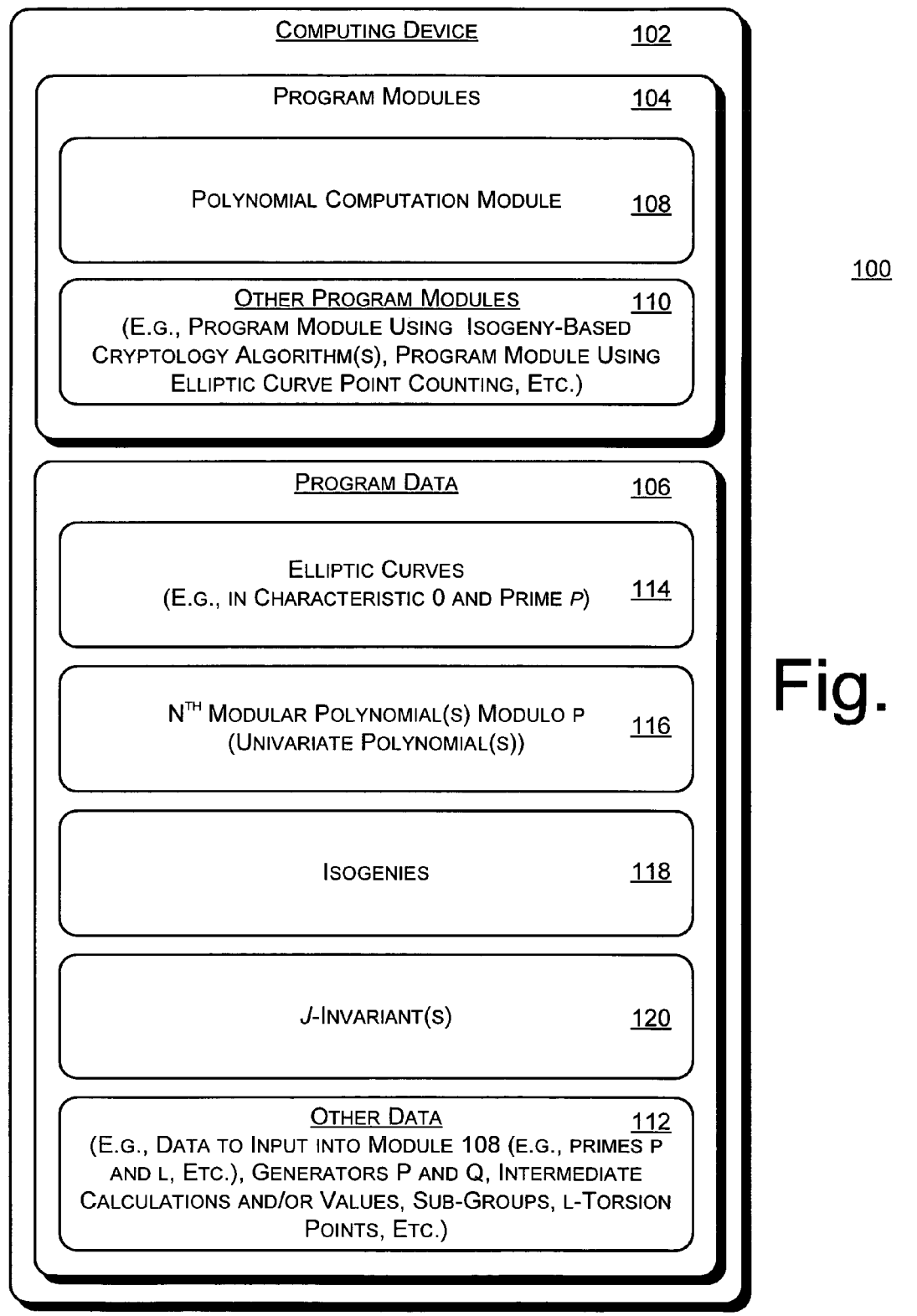
FIG. 1 illustrates an exemplary system for computing modular polynomials modulo large primes.
Figure 2:
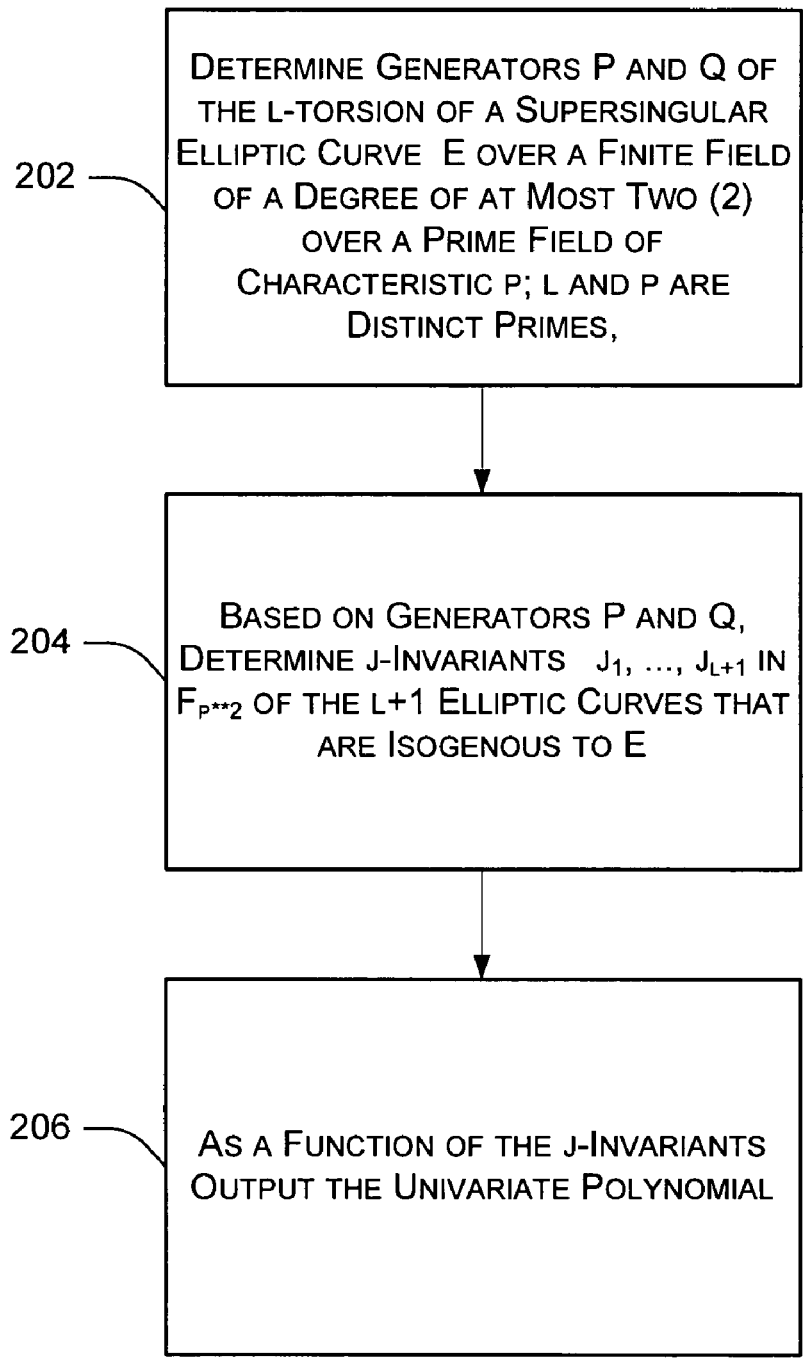
FIG. 2 shows an exemplary procedure to compute a univariate polynomial $\phi_l(x,j)$ modulo a prime p given a j-invariant j($\phi_l(x,j)$ is a polynomial of a single variable as j is a quantity (a number modulo p)).
Figure 3:
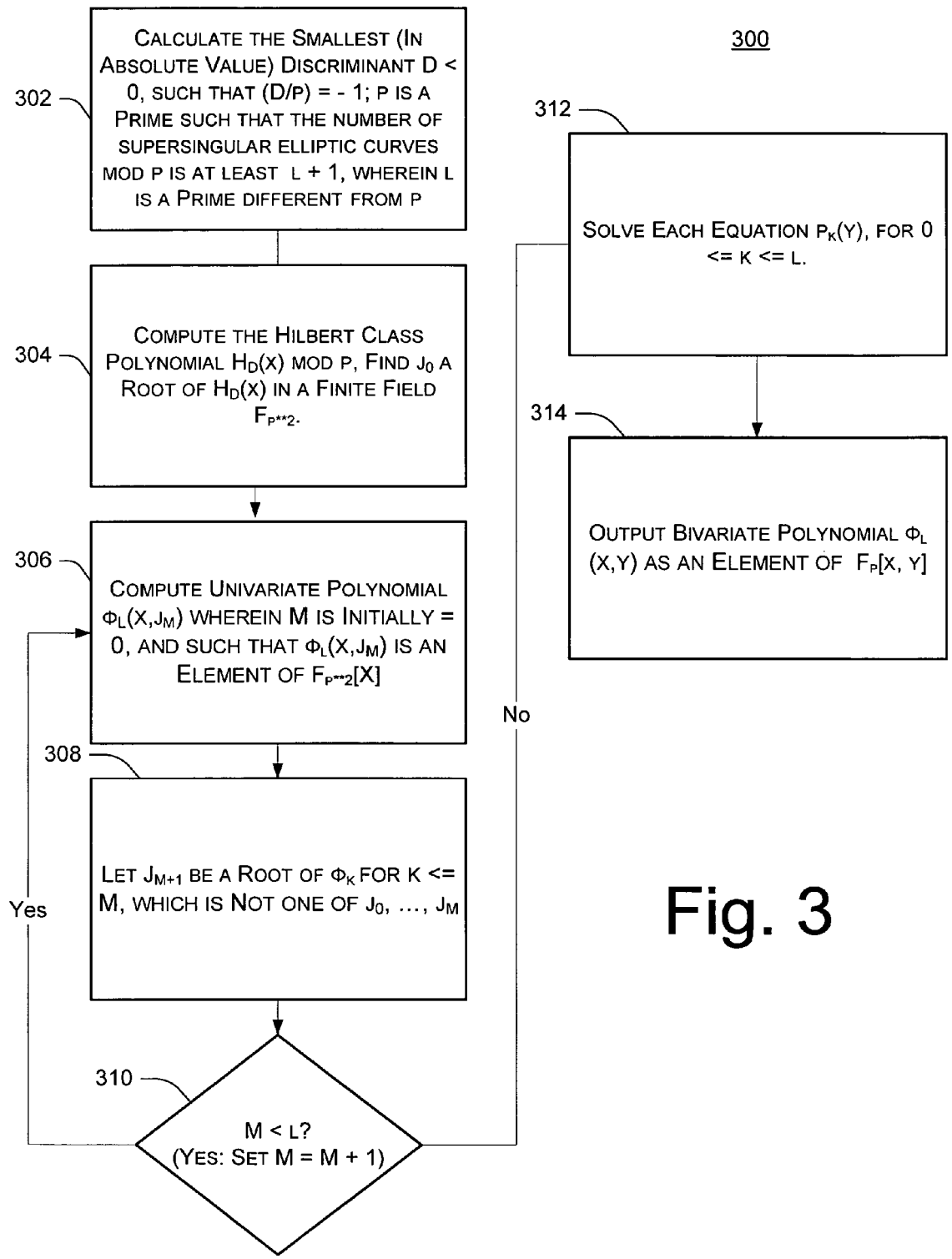
FIG. 3 shows an exemplary procedure to compute a bivariate polynomial $\phi_l(x,y)$ modulo a prime p given $\phi_l(x,j)$ for various j via interpolation ($\phi_l(x,y)$ is a polynomial of two variables (two unknowns)).

Systems and methods for computing modular polynomials modulo large primes are described with respect to FIGS. 1-3. In general, the systems and methods generate a pair of l-isogenous elliptic curves modulo a large prime p. The isogenous elliptic curves are determined using Velu's formulas. These and other aspects of the systems and methods for computing modular polynomials modulo large primes are now described in greater detail.

An Exemplary System

Although not required, the systems and methods for computing modular polynomials modulo large primes are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 illustrates an exemplary system 100 for computing modular polynomials modulo large primes. In this implementation, system 100 includes computing device 102. Computing device 102 is any type of computing device such as a personal computer, a laptop, a server, small form factor mobile computing device (e.g., a cellular phone, personal digital assistant, or handheld computer), etc. Computing device 102 includes program modules 104 and program data 106. Program modules 102 include, for example, polynomial computation module 108 and other program modules 110. Polynomial computation module computes modular polynomials modulo large primes p. (Large primes p are shown as respective portions of "other data" 112). To this end, polynomial computation module 108 generates a pair of n-isogenous elliptic curves 114 modulo a large prime p. The elliptic curves 114 are determined from Velu's formulas (see, component 116 of FIG. 1).

More particularly, and in one implementation (i.e., algorithm 1), polynomial computation module 108 computes an $l^{th}$ modular polynomial modulo p by computing all isogenies 118 of degree l from a given supersingular elliptic curve 114 modulo p via Vélu's well-known formulae. (See [11], Vélu, Jacques; *Isogénies entre courbes elliptiques*, C. R. Acad. Sc. Paris, 238-241, 1971). Next, modular polynomial computation module 108, for a given j-invariant 120 of a supersingular elliptic curve 114 over $F_{p^2}$, computes $\phi_l(x,j)$ (i.e., the univariate polynomial 116) modulo p by computing the l+1 distinct subgroups of order l and computing the j-invariants 120 of the l+1 corresponding l-isogenous elliptic curves 114. In contrast to conventional systems and techniques, this implementation does not use the factorization of the l-division polynomials to produce the subgroups of order l. Instead this implementation generates independent l-torsion points by picking random points with coordinates in an extension of $F_p$ which contains all the l-torsion points and taking a scalar multiple, which is the group order divided by l. This is more efficient than factoring the $l^{th}$ division polynomial for large l. This approach also provides, as a corollary, a very fast way to compute a random l-isogeny of an elliptic curve over a finite field for large l.

In another implementation (i.e., algorithm 2), polynomial computation module 108, uses the connectedness of the graph of supersingular elliptic curves 114 over $F_{p^2}$ to move around the graph, obtaining different values p of j as described above in the previous paragraph, until enough information is obtained to compute $\phi_l(x,y)$ modulo p (i.e., the bivariate polynomial) via interpolation. The assumption that the number of supersingular elliptic curves mod p (the quantity S(p)) is at least l+1 guarantees that we have enough information to do the interpolation. This implementation computes $\phi_l(x,y)$ modulo p by doing only computations with supersingular elliptic curves 114 in characteristic p even though $\phi_l(x,y)$ is a general object giving information about isogenies between elliptic curves 114 in characteristic 0 and ordinary elliptic curves 114 in characteristic p. Thus, for all of the isomorphism classes of supersingular elliptic curves 114, the full l-torsion is defined over an extension of degree O(l) of the base field $F_{p^2}$, whereas for non-supersingular elliptic curves the field of definition of the l-torsion can be of degree $O(l^2)$.

Computing a Univariate Polynomial Modulo Prime p Given j-Invariant j

FIG. 2 shows an exemplary procedure 200 to compute a univariate polynomial $\phi_l(x,j)$ modulo a prime p given a j-invariant j. An ingredient of an exemplary first implementation (algorithm 1) for computing modular polynomials modulo large primes is the computation of the univariate polynomial $\phi_l(x,j)$ modulo a prime p given a j-invariant j. Input into polynomial computation module 108 are two (2) distinct primes p and l, and j the j-invariant 120 of a supersingular elliptic curve E 114 over a finite field $F_q$ of degree at most two (2) over a prime field of characteristic p. The output is polynomial 116, such that $\phi_l(x,j) = \Pi_{E'\text{-isogenous to }E}(x-j(E')) \in F_{p^2}[x]$. For purposes of discussion and illustration, operations of the procedure are described with respect to components of FIG. 1. The left-most digit of a component reference number identifies the particular figure in which the component first appears.

At block 202, polynomial computation module 108 find the generators P and Q of E[1]. To this end:
(a) Let n be such that $F_q(E[l]) \subseteq F_{q^n}$.
(b) Let $S=\#E(F_{q^n})$, the number of $F_{q^n}$ rational points on E. (Original)
(c) Set $S=S/l^k$, where $l^k$ is the largest power of l that divides S (note $k \geq 2$).
(d) Pick two points P and Q at random from E[l]:
  (i) Pick two points U, V at random from $E(F_{q^n})$
  (ii) Set P'=sU and Q'=sV, if either P' or Q' equals O then repeat step (i).
  (iii) Find the smallest $i_1, i_2$ such that $l^{i_1}P' \neq O$ and $l^{i_2}Q' \neq O$ but $l^{i_1+1}P'=O$ and $l^{i_2+1}Q'=O$.
  (iv) Set $P=l^{i_1}P'$ and $Q=l^{i_2}Q'$.
(e) Using the well-known Shanks's Baby-steps-Giant-steps algorithm, determine if Q belongs to the group generated by P. If so, step (d) is repeated.

At block 204, polynomial computation module 108 determines the j-invariants $j_1, L, j_{l+1}$ in $F_{p^2}$ of the l+1 elliptic curves that are isogenous to E. To this end:
(a) Let $G_1=<Q>$ and $G_{l+i}=<P+(i-1)*Q>$ for $1 \leq i \leq l$.
(b) For each i, $1 \leq i \leq l+1$ compute the j-invariant of the elliptic curve $E/G_i$ using Vélu's formulas.

At block 206, polynomial computation module 108 outputs $\phi_l(x,j) = \Pi_{l \leq i \leq l+1}(x-j_i)$: univariate Polynomial 116. Polynomial 116 has coefficients in $F_{p^2}[x]$ since all the curves l-isogenous to E are supersingular and hence their j-invariants belong to $F_{p^2}$.

The following lemma 1 gives the possibilities for the value of n at block 202(*a*). Let $E/F_q$ be an elliptic curve, and let l be a prime not equal to the characteristic of $F_q$. Then $E[l] \subseteq E(F_{q^n})$ where n is a divisor of either l(l−1) or $l^2−1$. The Weil-pairing tells us that if $E[l] \subseteq F_{q^n}$ then $\mu_l \subseteq F_{q^n}$ ([12] Corollary 8.1.1). We seek, however, an upper bound on n, to do this we use the Galois representation coming from the l-division points of E. Indeed, we have an injective group homomorphism:

$\rho_l: (F_q(E[l])/F_q) \to \text{Aut}(E[l]) \cong _2(F_l)$.

The Galois group $(F_q(E[l])/F_q)$ is cyclic, thus by $\rho_l$ the possibilities for $(F_q(E[l])/F_q)$ are limited to cyclic subgroups of $_2(F_l)$. We study the following map $_2(F_l) \psi \to _2(F_l) \to _2(F_l)$, wherein the map $\psi$ is given by $$\psi(M) = \frac{1}{\det M} M.$$

The cyclic subgroups of $_2(F_l)$ are either of order 1 or of cardinality dividing (l±1)/k, where k=gcd(l−1,2). If C is a cyclic subgroup of $_2(F_l)$ then its image in $_2(F_l)$ is annihilated by either l or l±1. Since the image is obtained by quotienting out by scalars and then a group of order 2, C is annihilated by either l(l−1) or $(l−1)(l+1)=l^2−1$. Thus the degree of the field extension containing the l-torsion points on E must divide either l(l−1) or $l^2−1$.

The operations of block 202 use $n=l^2−1$. However, if corresponding operations (d) and (e) do not succeed for some K (a constant) number of iterations, n=l(l−1) is utilized. The following analysis shows that a sufficiently large constant K will work.

Operation (b) of block 202 does not need a point counting algorithm to determine S. Since E is a supersingular elliptic curve, 114 we have the following choices for the trace of Frobenius $a_q$:

$$a_q = \begin{cases} 0 & \text{if } E \text{ is over } F_p \\ 0, \pm p, \pm 2p & \text{if } E \text{ is over } F_{p^2} \end{cases}.$$

A deterministic point counting algorithm could also be used to find $\#E(F_q)$, but this would cost $O(\log^6 q)$ field operations.

The probability with which operations of block 202(*d*) succeeds is determined as follows. For a random choice of the points U and V in (d)(i), the probability that step (d)(ii) succeeds is at least $$\left(1 - \frac{1}{l^2}\right)^2.$$

As a group $E(F_{q^n}) \cong Z/NZ \times Z/MNZ$, where N=lN' since l-torsion points of E are $F_{q^n}$ rational. Using this isomorphism one sees that the probability that sU=O is bounded above by $$\frac{N'}{N} \frac{MN'}{MN} = \frac{1}{l^2}.$$

At block 202(*d*) completion, we have two random l-torsion points of E namely, P and Q. The probability that Q belongs to the cyclic group generated by P is $$\frac{1}{l^2} = \frac{1}{l}.$$

Thus with high probability we will find in block 202(*e*), two generators for E[l].

In this implementation, execution time for operations of block 202 is $O(l^{4+o(l)} \log^{2+o(l)} q)$. The finite field $F_{q^n}$ is constructed by picking an irreducible polynomial of degree n. A randomized method that requires on average $O((n^2 \log n + n \log q) \log n \log\log n)$ operations over $F_q$ is given in [11]. Thus the field can be constructed in $O(l^{4+o(l)} \log^{2+o(l)} q)$ time since $n \leq l^2$. Step (1d) requires picking a random point on E. We can do this by picking a random element in $F_{q^n}$ treating it as the x-coordinate of a point on E and solving the resulting quadratic equation for the y-coordinate. Choosing a random element in $F_{q^n}$ can be done in $O(l^2 \log q)$ time. Solving the quadratic equation can be done probabilistically in $O(l^2 \log q)$ field operations. Thus to pick a point on E can be done in $O(l^{4+o(l)} \log^{2+o(l)} q)$ time. The computation in steps (1d i-iv) computes integer multiples of a point on the elliptic curve, where the integer is at most $q^n$, and this can be done in $O(l^{4+o(l)} \log^{2+o(l)} q)$ time using the repeated squaring method and fast multiplication. Shank's Baby-steps-giant-steps algorithm for a cyclic group G requires $O(\sqrt{|G|})$ group operations. Thus step (1e) runs in time $$O(l^{\frac{5}{2}+o(1)} \log^{1+o(1)} q),$$

since the group is cyclic of order l.

Let C be a subgroup of E, Vélu [11] provides explicit formulas for determining the equation of the isogeny $E \to E/C$ and the Weierstrass equation of the curve E/C. Let E is given by the equation $$y^2 + a_1 xy + a_3 y = x^3 + a_2 x^2 + a_4 x + a_6,$$

wherein S is a set of representatives for $(C-\{O\})/\pm 1$. The following two functions are defined in $F_q(E)$ for $Q=(x,y)$ a point on $E-\{O\}$: define $$g^x(Q) = 3x^2 + 2a_2 x + a_4 - a_1 y$$

$$g^y(Q) = -2y - a_1 x - a_3.$$

The following is set:

$$t(Q) = \{g^x(Q) \text{ if } Q = -Q \text{ on } E; 2g^x(Q) - a_1 g^y(Q)\},$$

otherwise, $u(Q) = (g^y(Q))^2 t = \sum_{Q \in S} t(Q) w = \sum_{Q \in S} (u(Q) + x(Q)t(Q))$.

The curve E/C is given by the Weierstrass equation:

$$Y^2 + A_1 XY + A_3 Y = X^3 + A_2 X^2 + A_4 X + A_6,$$

wherein
$A_1 = a_1, A_2 = a_2, A_3 = a_3, A_4 = a_4 - 5t, A_6 = a_6 - (a_1^2 + 4a_2)t - 7w$.

From the Weierstrass equation of E/C we can determine the j-invariant of E/C. These operations are implemented using $O(1)$ elliptic curve operations for each of the groups $G_i$, $1 \leq i \leq l+1$. Thus operations of block 204 are implemented in $O(l^{4+o(l)} \log^{l+o(l)} q)$ time steps. Operations of block 206 require only $O(l)$ field operations. As such, running time of this implementation of procedure 200 is dominated by the running time of operations associated with blocks 202 and 204.

In view of the above, procedure 200 computes $\phi_l(x,j) \in F_{p^2}$ [x] together with the list of its roots and has an expected running time of $O(n^{2+o(l)} \log^{2+o(l)} q + \sqrt{l} n^{l+o(l)} \log^{l+o(l)} q + l^2 n^{l+o(l)} \log q)$. The running time of procedure 200 depends on terms of the quantity n. As described below in reference to FIG. 3, this dependence becomes explicit. In the case of ordinary elliptic curve 114, operations of block 202 can used once the number of points on $E/F_q$ has been determined, by Lemma 2 the degree of the extension, n, is still $O(l^2)$. This leads to the following two results: If $E/F_q$ is an elliptic curve, we can pick a random l-torsion point on E($F_q$) in time $O(l^{4+o(l)} \log^{2+o(l)} q + \log^{6+o(l)} q)$. If $E/F_q$ is an elliptic curve, we can construct a random l-isogenous curve to E in time $O(l^{4+o(l)} \log^{2+o(l)} q + \log^{6+o(l)} q)$.

Computing a Univariate Polynomial Modulo Prime p Via Interpolation

FIG. 3 shows an exemplary procedure 300 to compute $\phi_l(x,y) \mod p$ provided $S(p) \geq l+1$, where $S(p)$ is the number of isomorphism classes of supersingular elliptic curves modulo p (computing a univariate polynomial modulo a prime p given a j-invariant j via interpolation). In characteristic $p > 2$ there are exactly $$S(p) = \left\lfloor \frac{p}{12} \right\rfloor + \epsilon_p$$

supersingular j-invariants where
$\epsilon_p = 0,1,1,2$ if $p = -1,5,7,11 \mod 12$.

For purposes of discussion and illustration, operations of the procedure are described with respect to components of FIG. 1 and operations procedure 200 of FIG. 2. The left-most digit of a component reference number identifies the particular figure in which the component first appears.

Input to procedure 300 are two distinct primes l and p with $S(p) \geq l+1$. At block 302, polynomial computation module 108 calculates the smallest (in absolute value) discriminant $D < 0$ such that $(D/P) = -1$. At block 304, polynomial computation module 108 computes the Hilbert Class polynomial $H_D(x) \mod p$. Let $j_0$ be a root of $H_D(X)$ in $F_{p^2}$. At block 306, and with i initially set to equal zero (0), polynomial computation module 108 computes $\phi_i = \phi_l(x, j_i) \in F_{p^2}$ via operations of procedure 200, which was described above with respect to FIG. 2.

At block 308, let $j_{i+1}$ be a root of $\phi_k$ for $k \leq i$ which is not one of $j_0, L, j_i$. At block 310, if $i < l$ then polynomial computation module 108 sets $i = i+1$ and repeats operations of block 306. At this point, and writing $\phi_l(x,y) = x^{l+1} + \sum_{0 \leq k \leq l} p_k(y) x^k$, we have l+1 systems of equations of the form $p_k(j_i) = v_{ki}$ for $0 \leq k, i \leq l$. At block 312, polynomial computation module 108 solves these equations for each $p_k(y)$, $0 \leq k \leq l$.

At block 314, polynomial computation module 108 outputs in this implementation, $\phi_l(x,y) \in F_p[x,y]$.

Lemma 2, as follows, shows that this second implementation is correct. For operations of block 302, we note that if $p \equiv 3 \mod 4$, then $D = -4$ works. Otherwise, $-1$ is a quadratic residue and writing (without loss of generality) D as $-4d$, we are looking for the smallest d such that $$\left(\frac{d}{p}\right) = -1.$$

A theorem of Burgess ([4]) tells us that $$Rectangle == p^{\frac{1}{4\sqrt{e}}},$$

and under the assumption of Generalized Riemann Hypothesis (GRH) the estimate of Ankeny gives Rectangle$=\log^2 p$ (Techniques to implement this estimate are well-known—Ankeny, N., C.; *The least quadratic non-residue*, Annals of Math., (2), 65-72, 1952). Computing $H_D(x) \mod p$ can be done in $O(d^2 (\log d)^2)$ time [8] §5.10. Thus operations of block

304 use $O(\sqrt{p}\log^2 p)$ time, and under the assumption of GRH uses $O(\log^4 p (\log\log p)^2)$ time. Since $$\left(\frac{D}{p}\right) = -1$$

all the roots of $H_D(x)$ are supersingular j-invariants in characteristic p. $H_D(X)$ is a polynomial of degree $h(\sqrt{-D})$, the class number of the order of discriminant D, and this is Rectangle $$= |D|^{\frac{1}{2}+\varepsilon},$$

by Siegel's well-known theorem. Finding a root of $H_D(x) \in F_{p^2}$ is done in $O(d^{l+\epsilon}\log^{2+o(l)} p)$ time using probabilistic factoring algorithms, where $d=|D|$. The graph with supersingular j-invariants over charactertistic p as vertices and l-isogenies as edges is connected (see [7]), consequently, we will always find a j-invariant in block 308 that is not one of $j_0, L, j_i$. Thus the loop represented by blocks 306-310 executed exactly l+1 times under the assumption that $S(p) \geq l+1$. Even though algorithm 1, as described above, uses $O^{\%}(l^4 \log^2 q)$ time in the worst case, we assert that for substantially all of the iterations of the loop, algorithm 1 actually runs in $O^{\%}(l^3 \log^2 q)$ time. (Soft-Oh $O^{\%}$ notation is used when factors of the form logl or loglog p are ignored).

Let $E_1, L, E_{S(p)}$ be the supersingular elliptic curves (unique up to isomorphism) 114 defined over $F_{p^2}$. Then for all elliptic curves 114 the extension degree $[F_{p^2}(E_i[1]):F_{p^2}]$, $1 \leq i \leq S(p)$ divides $6(l-1)$. Let $E/F_{p^2}$ be a supersingular curve 114 and let t be the trace of Frobenius. Then the Frobenius map $\phi$ satisfies $\phi^2 - t\phi + p^2 = 0$.

Suppose $t = \pm 2p$, then the characteristic equation of Frobenius factors as $(\phi \pm p)^2$. Thus the action of Frobenius on the vector space of l-torsion points is not irreducible. In particular, there is a non-zero eigenspace $V \subseteq E[1]$, where $\phi$ acts as multiplication by $\pm p$. Thus there is a non-zero vector $v \in V$ whose orbit under Frobenius is of size dividing l-1. Let P be the l-torsion point corresponding to v. Then $[F_{p^2}(P): F_{p^2}]$ divides l-1. Since E is supersingular, its embedding degree is 6, thus the extension $F_{p^2}(E[1])/F_{p^2}(P)$ is of degree dividing 6. The other cases can be handled similarly.

In view of the above, algorithm 1 can be run with the quantity $n=6(l-1)$ (the value and feasibility of n is efficiently tested). Thus, algorithm 1 runs in expected time $O(l^{3+o(l)} \log^{2+o(l)} p)$ for all iterations of the loop. As such, the loop runs in expected time $O(l^{4+o(l)} \log^{2+o(l)} p)$.

Writing the modular polynomial $\phi_l(x,y)$ as $x^{l+1} + \Sigma_{0 \leq k \leq l} P_k(Y) X^k$, we know that $P_0(Y)$ is monic of degree l+1 and $\deg(p_k(y)) \leq l$ for $1 \leq k \leq l$. Thus at the end of the loop of blocks 306 through 310, there is enough information to solve for the $P_k(Y)$ in the operations of block 312. More particularly, l+1 systems of equations are being solved, each using an inversion of a matrix of size $(l+1) \times (l+1)$. This is done in $0(l^4 \log^{l+o(l)} p)$ time. Since the polynomial $\phi_l(x,y)$ mod p is a reduction of the classical modular polynomial, a polynomial with integer coefficients, the modular polynomial generated by the systems and methods of system 100 has coefficients in $F_p$. Accordingly, we have proved the following theorem:

Given l and p distinct primes such that $S(p) \geq l+1$, algorithm 2 computes $\phi_l(x,y) \in F_p[x, y]$ in expected time $O(l^{4+o(l)} \log^{2+o(l)} p + \log^4 p \log\log p)$ under the assumption of GRH. Hence, $\phi_l(x,y)$ modulo a prime p is computed in $O^{\%}(l^4 \log^2 p + \log^4 p)$ time if $p \geq 12l + 13$.

When allowed to pick a prime p, such as would be the case when computing $\phi_l$ over the integers using the Chinese Remainder Theorem combined with the method of FIGS. 2 and 3, then the assumption of GRH in the above theorem can be eliminated. For example, for primes $p \equiv 3 \mod 4$ the j-invariant 1728 is supersingular. Thus in block 304 of FIG. 3, $j_0 = 1728$ can be initially utilized for any such prime. Hence the GRH to a bound D is not needed in the analysis of the running time of these operations.

An Exemplary Operating Environment

Figure 4:
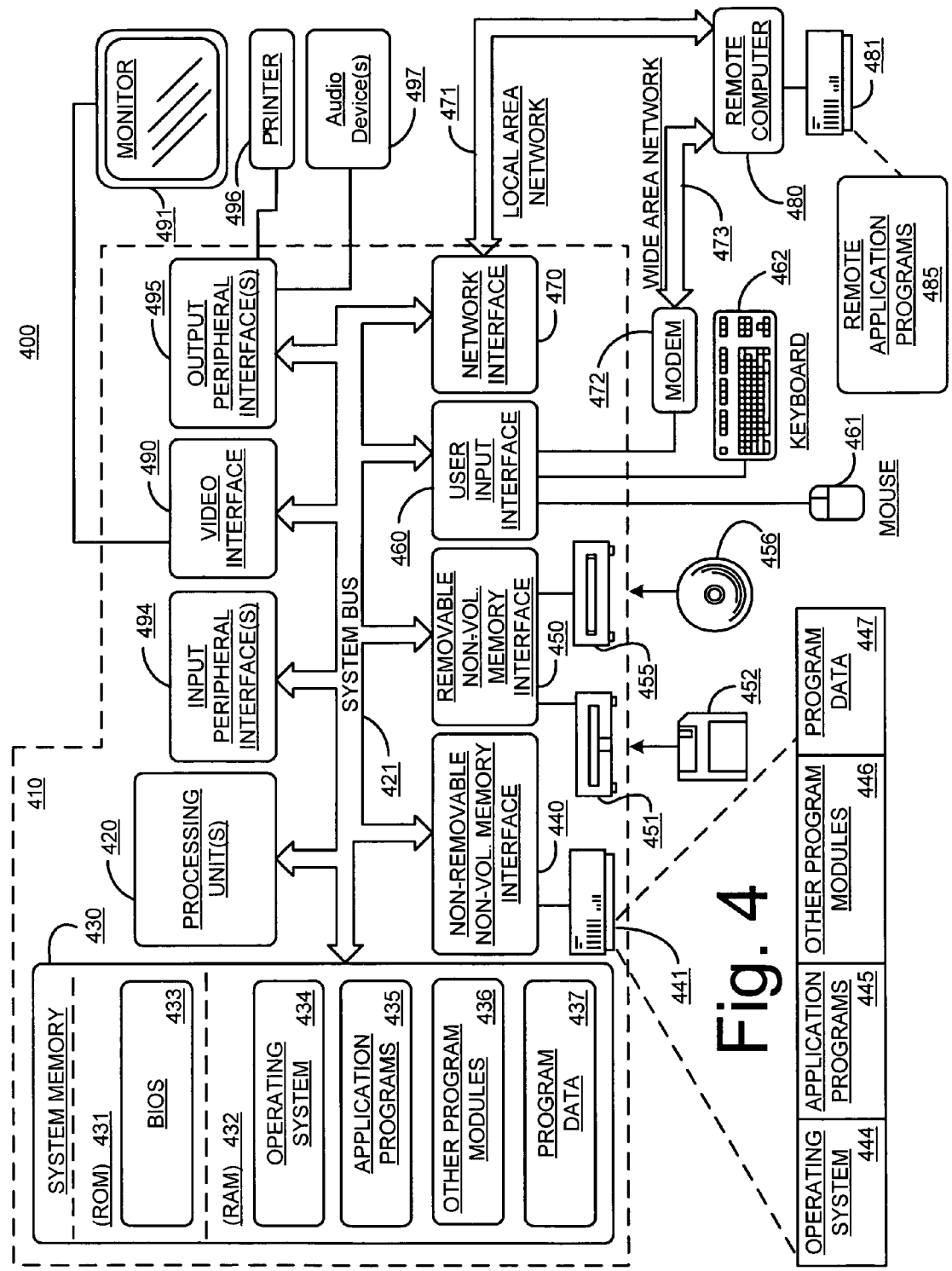
FIG. 4 shows an example of a suitable computing environment in which systems and methods for computing modular polynomials modulo large primes may be fully or partially implemented.

FIG. 4 illustrates an example of a suitable computing environment 400 in which the systems and methods for computing modular polynomials modulo large primes may be fully or partially implemented. Exemplary computing environment 400 is only one example of a suitable computing environment for the exemplary system of FIG. 1 and exemplary operations of FIG. 2, and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system, environments or configurations. Examples of well-known computing systems, environments, and/or configurations that may be suitable for use include, but are not limited to, personal computers, laptops, small form factor mobile computing device (e.g., a cellular phone, personal digital assistant, or handheld computer), server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 4, an exemplary system 400 illustrates an example of a suitable computing environment in which systems and methods for computing modular polynomials modulo large primes may be fully or partially implemented. System 400 includes a general purpose computing device in the form of a computer 410 implementing, for example, computing device 102 of FIG. 1. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Application programs 435 include, for example, program modules 104 of FIG. 1. Program data 437 includes, for example, program data 106 of FIG. 1. Operating system 444, application programs 445, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

In one implementation, a monitor 491 or other type of display device is also connected to the system bus 421 via an interface, such as a video interface 490. In addition to the monitor, computers may also include other peripheral output devices such as printer 496 and audio devices 497, which may be connected through an output peripheral interface 495.

The computer 410 operates in a networked environment using logical connections to one or more remote computers, such as a remote computer 480. The remote computer 480 may be a personal computer, a server, a router, a network PC, a peer device or other common network node, and as a function of its particular implementation, may include many or all of the elements (e.g., program module(s) 104 and program data 106, etc.) described above relative to the computer 102, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

CONCLUSION

Although the systems and methods for computing modular polynomials modulo large primes have been described in language specific to structural features and/or methodological operations or actions, it is understood that the implementations defined in the appended claims are not necessarily limited to the specific features or actions described. For example, the operations of polynomial computation module 108 of FIG. 1 can be utilized in a cryptosystem, for computational number theory, and/or in an elliptic curve point-counting algorithm. Examples of a cryptosystem module, a program module using computational number theory, or a module that implements an elliptic curve point-counting algorithm are shown as respective portions of "other program modules" 110 of FIG. 1. Accordingly, the specific features and operations are disclosed as exemplary forms of implementing the claimed subject matter.

REFERENCES

The following references are hereby incorporated by reference:

[1] Agashe, A.; Lauter, K.; Venkatesan, R.; *Constructing Elliptic Curves with a known number of points over a prime field*, in Lectures in honour of the 60th birthday of Hugh Cowie Williams, Fields Institute Communications Series, 1-17, 2003.

[2] Blake, I.; Seroussi, G.; Smart, N.; *Elliptic Curves in Cryptography*, Lond. Math. Soc., Lecture Note Series, Cambridge University Press, 1999.

[3] Bosma, W.; Cannon, J.; *Handbook of MAGMA functions*, Sydney, 2003.

[4] Burgess, D., A.; *On character sums and primitive roots*, Proc. London Math. Soc., III,, 179-192, 1962.

[5] Elkies, Noam; *Elliptic and modular curves over finite fields and related computational issues*, in Computational Perspectives on Number Theory: Proceedings of a Conference in Honor of A. O. L. Atkin (D. A. Buell and J. T. Teitelbaum, eds.), AMS/International Press, 21-76, 1998.

[6] Lenstra, A., K.; Lenstra, H., W., Jr.; *Algorithms in Number Theory*, Handbook of Theoretical Computer Science, Vol. A. Elsevier, 673-715, 1990.

[7] Mestre, J.-F.; *La méthode des graphes. Exemples et applications*, Proceedings of the international conference on class numbers and fundamental units of algebraic number fields, Nagoya Univ., Nagoya, 217-242, 1986.

[8] Schoof, René; *Nonsingular Plane Cubic Curves over Finite Fields*, J. Combinatorial Theory, 2, 183-208, 1987.

[9] Shoup, Victor; *Fast construction of irreducible polynomials over finite fields*, J. Symbolic Computation, 471-391, 1994.

[10] Silverman, Joseph, H.; *The Arithmetic of Elliptic Curves*, Graduate Texts in Mathematics, Springer-Verlag, 1986.

[11] Vélu, Jacques; *Isogénies entre courbes elliptiques*, C. R. Acad. Sc. Paris, 238-241, 1971.

The invention claimed is:

1. A method implemented by a computing device, the method comprising:
providing two distinct primes p and l;
providing j a j-invariant of a supersingular elliptic curve E over a finite field $F_q$ of degree at most 2 over a prime field of characteristic p;
determining univariate polynomial $\phi_l(x,j)$ modulo p by computing the l+1 distinct subgroups of order l and computing the j-invariants $(j_1, \ldots, j_{l+1})$ of the l+1 supersingular elliptic curves that are l-isogenous to E;
based on information associated with a plurality of values of j, determining bivariate polynomial $\phi_l(x, y)$ modulo p via interpolation; and
using the bivariate polynomial in a cryptosystem.

2. The method of claim 1 further comprising determining the generators P and Q of E[l].

3. The method of claim 1 further comprising determining the j-invariants $(j_1, \ldots, j_{l+1})$ in $F_{p^2}$ of the l+1 supersingular elliptic curves that are l-isogenous to E using Vélu's formulae.

4. The method of claim 1 wherein the cryptosystem uses the Chinese Remainder Theorem (CRT) to alleviate an assumption based on the Generalized Riemann Hypothesis (GRH).

* * * * *